United States Patent Office 2,696,478
Patented Dec. 7, 1954

2,696,478

COMPOSITIONS OF ACRYLONITRILE POLYMERS DISSOLVED IN 1-METHYL-2-PYRIDONE

Alfred B. Craig, Decatur, Ala., assignor to The Chemstrand Corporation, Decatur, Ala., a corporation of Delaware No Drawing. Application July 26, 1952, Serial No. 301,161

8 Claims. (Cl. 260—30.2)

This invention relates to new compositions of matter and products prepared therefrom. More particularly, the invention is concerned with the production of new solutions of acrylonitrile polymers and to shaped articles, such as films, fibers, filaments, sheets, ribbons, tubes, and the like, which can be formed therefrom.

"Polymers," as employed throughout the instant specification and claims, is intended to include polyacrylonitrile, copolymers and terpolymers containing acrylonitrile, and blends of polymeric acrylonitrile and copolymers of acrylonitrile with polymers and copolymers of other polymerizable mono-olefinic monomers.

While the present invention is applicable to the preparation of various shaped articles, such as enumerated above, from polymeric compositions comprising acrylonitrile polymers, for purposes of simplicity of description, the invention will be described as it is applicable to the formation of fibers and filaments, it being understood that is merely intended in an illustrative sense.

It is known that solutions of acrylonitrile polymers can be prepared by dissolving such polymers in various organic solvents or in aqueous solutions of certain inorganic metal salts. While such solutions may be employed for the manufacture of fibers or other shaped articles, certain difficulties are encountered in their preparation and use. When solutions prepared with metal salts are employed, the fibers and filaments, or other shaped articles, produced therefrom contain substantial deposits of the metal salts used which results in discontinuous or non-uniform structures. The deposits of the metal salts are extremely difficult to remove completely and even when removed completely, numerous voids and weak spots are left in the structures, which results in a spongy structure. In the case of fibers, a product such as this is undesirable for commercially acceptable synthetic fibers.

When various known organic solvents are employed in the formation of fibers or other shaped articles from solutions of acrylonitrile polymers, difficulties are also encountered. Acrylonitrile polymers are difficultly soluble in such organic solvents without resort to complicated procedures, such as careful preparation of the polymers, slurring or prolonged stirring, special steps such as precooling the solvent and mix, prolonged heating, and the like. These difficulties become greater as the proportion of acrylonitrile in the polymer is increased. In many of the successfully prepared solutions of acrylonitrile polymers, there is a tendency for the polymers to form gel particles, particularly upon standing or exposure to air, which clog the openings in the spinnerets used in the extrusion of fibers and filaments. In addition, many of the known organic solvents are inferior with respect to solvent properties, or are too costly to provide economical fiber-spinning solutions, or are too volatile or unstable at the temperatures employed in normal spinning operations.

Accordingly, the primary object of the present invention is to provide a new solvent for acrylonitrile polymers which is unusually effective in dissolving such polymers and in addition, is stable under normal spinning operations. Another object of the invention is the preparation of stable solutions of acrylonitrile polymers which can be readily formed into shaped articles by conventional methods. Another object of the present invention is to provide an improved method for preparing high tenacity fibers of acrylonitrile polymers. Other objects and advantages of the present invention will be apparent from the description thereof hereinafter.

In general, the objects of the present invention are accomplished by dispersing the acrylonitrile polymers, preferably in finely divided form, in 1-methyl-2-pyridone. The dispersion is then heated with stirring tumbling or other agitation until a free-flowing, uniform, homogeneous solution is obtained. Usually heating to a temperature within the range of 25° to 200° C. is sufficient to bring about complete dissolution of the polymer. The 1-methyl-2-pyridone solutions of acrylonitrile polymers are clear and homogeneous and readily susceptible to being formed and/or drawn into fibers, films, and the like, by known and conventional procedures.

In the preferred practice of the invention the polymers of acrylonitrile are employed in a finely divided form. Although massive polymers may be ground to desirable size, the selection of a suspension polymerization procedure, in accordance with the principles set out hereinafter, will produce the desired subdivided state directly without resort to separate comminution procedures.

The polymers which may be dissolved in 1-methyl-2-pyridone to form solutions for the production of shaped articles, as described herein, are polyacrylonitrile, copolymers of acrylonitrile with minor proportions of other monoolefinic compounds polymerizable therewith, and mixtures of acrylonitrile polymers with other polymeric compositions, including olefinic polymers or other types of polymeric substances. These mixtures, or blended polymeric compositions, are especially useful for the purpose of developing dye-receptive polymers, for example by blending non-dyeable acrylonitrile polymers with a minor proportion of a polymer chemically reactive with dyestuff. In general, there is a minimum proportion of acrylonitrile which should be present in polymeric form in order to have adequate tensile properties in the fibers prepared therefrom. Thus, a polymer of monomeric mixture of which acrylonitrile is at least 70% of the polymerizable content, is useful in the practice of this invention.

Useful polymers, other than polyacrylonitrile, are the copolymers of 80 or more percent of acrylonitrile and one or more percent of other mono-olefinic monomers. Suitable other monomers include, vinyl acetate and other vinyl esters of monocarboxylic acids, vinylidene chloride, vinyl chloride and other vinyl halides, dimethyl fumarate and other dialkyl esters of fumaric acid, dimethyl maleate and other dialkyl esters of maleic acid, methyl acrylate and other alkyl esters of acrylic acid, styrene and other vinyl substituted aromatic hydrocarbons, methyl methacrylate and other alkyl esters of methacrylic acid, methacrylonitrile alpha-vinylpyridine and other vinyl substituted heterocyclic nitrogen ring compounds, such as the vinyl imidazoles, etc., the alkyl substituted vinylpyridines, vinyl chloroacetate, allyl chloroacetate, methallyl chloroacetate, allyl glycidyl ether, methallyl glycidyl ether, allyl glycidyl phthalate and the corresponding esters of other aliphatic and aromatic dicarboxylic acids, glycidyl acrylate, glycidyl methacrylate and other mono-olefinic monomers copolymerizable with acrylonitrile. Of particular utility are the comonomers which contain one polymerizable olefinic radical whereby the copolymerization with acrylonitrile may be effected and one acidic, basic or otherwise reactive group capable of bonding the dyestuff with which the ultimate fiber may be treated.

Many of the more readily available comonomers for polymerization with acrylonitrile, form copolymers which are not reactive with the dyestuffs and may therefore be impossible or difficult to dye by conventional techniques. Accordingly, these non-dyeable fiber-forming copolymers may be blended with polymers or copolymers which are in themselves more dye-receptive by reason of their physical structure or by reason of the presence of functional groups which are chemically reactive with the dyestuff, whereby the dyestuff is permanently bonded to the polymer in a manner which lends resistance to the usual laundering and dry-cleaning procedures. Suitable blending polymers may be polyvinylpyridine, polymers of alkyl substituted vinylpyridine, polymers of other vinyl substituted N-heterocyclic compounds, the polymers of the various vinyl substituted N-heterocyclic compounds and other copolymerizable monomers, particularly acrylonitrile.

Of particular utility are the blends of non-dyeable acrylonitrile polymers of good fiber-forming properties for example, polyacrylonitrile or a copolymer of more than 90% acrylonitrile and up to 10% of vinyl acetate, and a copolymer of vinylpyridine or an alkyl substituted vinylpyridine and acrylonitrile, the said acrylonitrile being present in substantial proportions, for example, 50 to 80% to provide heat and solvent resistance, and a substantial proportion of the pyridine or derivative thereof to render the blend receptive to acid dyestuffs. Of particular utility are the blends of copolymers of 90 to 98% acrylonitrile and 2 to 10% vinyl acetate and sufficient copolymer of 10 to 70% acrylonitrile and 30 to 90% vinylpyridine to produce a blended composition with a total of 3 to 8% by weight of vinylpyridine.

Other compositions suitable for blending with non-dyeable acrylonitrile polymers are: the polyamides prepared by condensing an alkylene diamine having up to six carbon atoms and a compound of the group consisting of crotonic acid, acrylic acid, methacrylic acid and the alkyl esters of these acids, wherein the alkyl radical has up to five carbon atoms; the polyamides prepared by condensing N-alkylazadinitriles with formaldehyde; the polyesters prepared by reacting dicarboxylic acids with glycols containing tertiary amino groups; and other polymers containing tertiary amino radicals capable of reacting chemically with the acid dyestuffs.

A further class of useful dye-receptive resins suitable for blending with the non-dye-receptive acrylonitrile polymers are the tertiary amino group containing polymers and copolymers described in the preceding paragraphs which have been reacted with aliphatic halides, for example, butyl bromide, chloracetic acid, methyl chloroacetate, with the esters of oxygen containing sulfur acids, which acids have ionization constants less than $10^{-4}$, for example, methyl sulfate and methyl p-toluenesulfonate and with the various acids, such as sulfuric acid, hydrochloric acid and benzenesulfonic acid. By these reactions blending resins containing amino groups are converted to quaternary or tertiary ammonium salts, which are more dye-receptive than are the corresponding amino group containing resins.

Such polymers may be fabricated into fibers or films of unusual properties, for example, high tensile strength, unusual thermal and chemical stability, and exceptional resistance to solvents. The optimum combination of physical and chemical properties are found in the polymers and copolymers of larger proportions of acrylonitrile, for example in excess of 85%. It will be found that the practice of this invention with respect to the latter class of substances is most beneficial.

In the practice of this invention, as in the preparation of acrylonitrile fibers by prior art methods, the physical properties of the polymers are of substantial importance. It is desirable that the polymers be uniform with respect to molecular weight, particle size, and chemical composition. Accordingly, the methods for their preparation must be selected so as to induce the uniformity of chemical and physical properties. In general, the molecular weight should be in excess of 10,000 and preferably in excess of 25,000, the molecular weights being determined by measuring the viscosity of dilute solutions in the manner well-known in the art.

It has been found that polymers and copolymers of desirable physical properties are those which are prepared by the aqueous suspension technique, wherein the monomers or mixture of monomers are added to an aqueous medium maintained under conditions suitable for a rapid but controlled polymerization. The aqueous medium should contain a water-soluble peroxy catalyst and a dispersing agent which induces the precipitation of a finely divided polymer during the reaction. In order to insure the optimum concentration of peroxy catalyst and dispersing agent it is frequently desirable to add the catalyst and dispersing agent continuously or intermittently throughout the course of the reaction. The preferred practice involves the charging of the monomers or mixtures of monomers, gradually during the course of the reaction at a uniform rate or at a varying rate which permits the maintenance of the reaction at a constant temperature, for example, the reflux temperature.

The fiber-forming acrylonitrile polymers are prepared by polymerization in the presence of water-soluble peroxide catalysts, such as the alkali metal salts of the various peroxy acids, for example, sodium perborate, sodium percarbonate, and potassium persulfate. Stabilizing or dispersing agents, such as the water-soluble salts of the sulfonated mahogany acids, salts of the formaldehyde condensed naphthalene sulfonic acids, salts of sulfonated alkylbenzenes, salts of triethanolamine, sodium stearate and other salts of carboxylic acids, and mixtures thereof prepared by the saponification of animal and vegetable oils.

Desirable methods for the preparation of acrylonitrile polymers of uniform molecular weight involve the use of regulators, for example, tertiary dodecyl mercaptan, beta-mercaptoethanol, thioglycolic acid, beta-mercaptopropionic acid, and acetaldehyde. The nature of the other monomeric substances being polymerized with the acrylonitrile may determine the type of substance useful as a regulator. For example, in the copolymerization of acrylonitrile with monomers, such as vinyl acetate, methyl methacrylate, and styrene, thioglycolic acid is unusually beneficial. However, in the preparation of copolymers of the basic monomers, such as vinylpyridine, the use of tertiary aliphatic mercaptans will be found to be very effective.

It is desirable to use a solution of as high a concentration as possible, but the maximum concentration is dependent upon the molecular weight of the polymer and the viscosity characteristics of the polymer-solvent mixture. To obtain fibers of optimum physical properties polymers of molecular weights in excess of 25,000 are used, and with such polymers it is only possible to dissolve a relatively small proportion in the 1-methyl-2-pyridone without exceeding practical viscosity values. Although as little as 5% of polymer can be used in the spinning solution, such low concentrations are undesirable because they necessitate the removal of too much solvent from the extruded solution, thereby increasing solvent recovery cost as well as reducing spinning speed and lengthening the period required for coagulation. The concentration of polymer in the spinning solution is usually between eight and 35 percent, but concentrations up to the maximum are practicable. The concentration of the polymer will ultimately be determined by considering the desired physical properties of the fiber and the speed of spinning, the latter depending upon the concentration and viscosity of the spinning solution. The viscosity will depend upon the chemical composition and molecular weight of the polymer, and the optimum concentration can best be determined by selecting a uniform high molecular weight polymer having good fiber-forming properties, and dissolving a given amount in as little of the 1-methyl-2-pyridone as possible to form a viscous solution capable of being spun at convenient temperatures.

The fibers are spun by extruding the polymer solution through an orifice, or a spinneret having a plurality of orifices, into a medium which removes the 1-methyl-2-pyridone. The volume of solution passed through the spinneret in a given time must be constant in order to produce a fiber of a uniform size. This is best achieved by using a positively driven gear pump adapted to deliver a constant flow of solution regardless of minor changes in viscosity and the variable resistance offered by the spinneret. It is also desirable to pass the solution, which has been prefiltered, through one or more additional filters before the spinneret to remove the last traces of foreign matter and particles of incompletely dissolved polymer. The polymers may be delivered to the gear pump by pressures applied by an inert gas to the solution reservoir, which is heated if necessary, to make the solution fluid enough to pass through the conduits. The extruding operation should be operated at elevated temperatures, but well below the boiling point of the solvent to facilitate the handling of the apparatus.

The medium into which the solution is extruded and which removes the solvent is preferably liquid. The method involving the use of liquids, known as "wet spinning," usually utilizes water, alcohol, salt solutions or any liquid which is a solvent for the 1-methyl-2-pyridone, but in which the polymer is insoluble. The solvent is leached out of the stream of polymer solution which becomes a viscous stream and finally a solid filament. When a spinneret with a plurality of apertures is employed, the several streams of polymer converge to form a single strand or tow. The spin bath must necessarily be of sufficient size to permit the complete, or substantially complete, removal of the solvent. Obviously, the rapidity of extrusion will also effect the size of the spin bath, high speeds requiring longer baths. The temperature of the bath also affects the size, higher temperatures permitting more rapid diffusion of the solvent out of the fiber and thereby permitting the use of shorter baths.

In general, the methods of wet spinning which are in commercial use are readily adaptable to spinning solutions of polymers in 1-methyl-2-pyridone. Similarly, conventional automatic machinery for spinning continuously, drying the thread if necessary, and winding it upon suitable spools can be used. As in the case of most synthetic fibers, those produced from the polymers of acrylonitrile, which are spun from 1-methyl-2-pyridone solutions, must be oriented by stretching to develop optimum physical properties. If desired, part of this stretching may be accomplished in the spin bath, by drawing the fiber out of the bath more rapidly than the rate of extrusion.

Further details of the practice of the present invention are set forth with respect to the following examples, which are merely intended to be illustrative and not limitative.

Example I

Finely divided polyacrylonitrile (100%) was dispersed in 1-methyl-2-pyridone. The dispersion was then heated to a temperature of 120° C. with stirring. A clear homogeneous solution or dope containing 10% solids was obtained from which fibers could readily be drawn. The solution was coagulated by pouring into water and in this manner fibers can readily be formed from the solution using the conventional wet spinning process.

Example II

A finely divided copolymer containing 95% acrylonitrile and 5% vinyl acetate by weight in the polymer molecule was dispersed in 1-methyl-2-pyridone. Thereafter, the dispersion was heated to a temperature of approximately 100° C. with stirring and a clear homogeneous solution or dope resulted which contained 10% solids. Fibers could readily be drawn from this clear solution and when the same was passed through a spinneret into a water bath, fibers having excellent tensile and elongation properties were obtained after the same had been washed, dried and steam-stretched for orientation.

1-methyl-2-pyridone solutions of acrylonitrile polymers can also be cast into the form of films by the usual conventional methods, for example, by passing the solution from a hopper onto a rotating metallic surface under the smoothing action of a doctor blade. In addition, molded articles can be prepared from the 1-methyl-2-pyridone solutions of the present invention. Further, the solutions or compositions of the instant invention may be employed as lacquers, coating materials, etc. Numerous other advantages of the present invention will be apparent to those skilled in the art.

It is to be understood that changes and variations may be made without departing from the spirit and scope of the invention as defined in the appended claims.

I claim:
1. A new composition of matter comprising a homogeneous miscible mixture of 1-methyl-2-pyridone and a polymer of monomeric substances of which acrylonitrile is at least 70% by weight of the polymerizable content.
2. A new composition of matter as defined in claim 1 wherein the polymer is polyacrylonitrile.
3. A new composition of matter as defined in claim 1 wherein the polymer is a copolymer containing by weight in the polymer molecule 95% acrylonitrile and 5% vinyl acetate.
4. A new composition of matter as defined in claim 1 wherein the polymer is a copolymer containing by weight in the polymer molecule from 90 to 98% acrylonitrile and from 2 to 10% of a vinylpyridine.
5. A new composition of matter as defined in claim 1 wherein the polymer is a blend comprising a binary interpolymer containing by weight in the polymer molecule from 90 to 98% acrylonitrile and from 2 to 10% of vinyl acetate, with a sufficient quantity of a binary interpolymer containing by weight in the polymer molecule from 0 to 70% of acrylonitrile and from 30 to 100% of 2-vinylpyridine, to give an overall 2-vinylpyridine content of 3 to 8% by weight.
6. A new composition of matter as defined in claim 1 wherein the polymer is a terpolymer containing by weight in the polymer molecule at least 2% vinyl acetate, from 90 to 94% of acrylonitrile, and from 4 to 8% of 2-methyl-5-vinylpyridine.
7. A process for preparing a fiber-forming solution comprising mixing at least 5 percent of a polymer of monomeric substances of which acrylonitrile is at least 70% by weight of the polymerizable content with 1-methyl-2-pyridone and then heating the mixture to a temperature within the range of 25° to 200° C.
8. A process for preparing a polymeric solution comprising dispersing an acrylonitrile polymer containing at least 70% by weight of acrylonitrile in 1-methyl-2-pyridone and then heating the dispersion to a temperature in the range of 25° to 200° C.

References Cited in the file of this patent

UNITED STATES PATENTS

| Number | Name | Date |
|---|---|---|
| 2,404,719 | Houtz | July 13, 1946 |